United States Patent [19]

Millar et al.

[11] 4,300,672

[45] Nov. 17, 1981

[54] APPARATUS FOR FABRICATING TUBING

[75] Inventors: Barry C. Millar, Islington; Keith W. Little, Georgetown, both of Canada

[73] Assignee: Bundy Corporation, Detroit, Mich.

[21] Appl. No.: 30,763

[22] Filed: Apr. 17, 1979

Related U.S. Application Data

[63] Continuation of Ser. No. 816,074, Jul. 15, 1977, abandoned.

[51] Int. Cl.³ .............................................. B65G 25/04
[52] U.S. Cl. .................................. 198/486; 29/33 T; 414/745; 414/750; 414/753; 198/488; 198/774
[58] Field of Search ............... 414/736, 745, 748, 750, 414/753, 910; 198/339, 486, 570, 744, 488; 408/70; 83/409.1, 409.2; 72/405, 422; 10/12 T, 12.5; 29/33 P, 33 T, 563

[56] References Cited

U.S. PATENT DOCUMENTS

| | | | |
|---|---|---|---|
| 2,176,188 | 10/1939 | Poole et al. | |
| 2,679,748 | 6/1954 | Kent et al. | 198/339 X |
| 2,728,318 | 12/1955 | Burton | 10/12 T X |
| 3,033,025 | 5/1962 | McConnell et al. | 414/748 X |
| 3,098,570 | 7/1963 | Lindemann | 414/745 |
| 3,128,817 | 4/1964 | Shaver | 198/341 X |
| 3,270,864 | 9/1966 | Kay | 198/777 |
| 3,627,146 | 12/1971 | Berndt | 414/745 |
| 3,874,048 | 4/1975 | Millar et al. | 198/341 X |

*Primary Examiner*—Leslie J. Paperner
*Attorney, Agent, or Firm*—Harness, Dickey & Pierce

[57] ABSTRACT

There is disclosed an apparatus for automatically processing the end portions of a plurality of pieces of tubing of a constant predetermined length, comprising two separate processing modules the distance between which may be quickly changed for processing tubing of a different constant predetermined length, each module being independently powered and having its own transport means for moving the tubing in "hand-to-hand" fashion to and from all of the processing stations thereon, the transport means being designed to handle only the ends of the tubing disposed in the vicinity of the module. Means for synchronizing the transport means on the two modules is also disclosed.

11 Claims, 14 Drawing Figures

APPARATUS FOR FABRICATING TUBING

This is a continuation of application Ser. No. 816,074, filed July 15, 1977, abandoned.

BACKGROUND AND SUMMARY OF THE INVENTION

The present invention relates to the fabrication of parts from tubing on a mass production basis, for example the fabrication of such parts as automotive fuel, vapor, brake and transmission oil cooler lines by processing individual lengths of tubing to deburr the ends, assemble fittings, flare the ends and then blow out the tubing to remove any debris.

The closest existing machine of which Applicants are aware is the one disclosed in Applicants' prior U.S. Letters Pat. No. 3,874,048, issued 4/1/75 and assigned to the assignee of the present application, and particularly the assembling section 32 thereof. In that disclosure tubing is cut to measured lengths which are fed to a series of aligned work stations where they are progressively operated upon by assembling end fittings, flaring the end, and then bending the tubes to the required shape. Transfer between stations is accomplished by oscillating shafts disposed between the stations carrying transfer arms which swing back and forth above the work level. Each work station has a pair of tube clamps and each pair of arms carries grab clamps. Controls prevent release of the tube clamps at each station until the grab clamps have engaged the tube, and prevent release of the grab clamps until the tube clamps at the next station have engaged the tube.

Although that machine is capable of fabricating a large number of constant length pieces of tubing in a relatively short time period, like most mass production equipment it is relatively large and requires a great deal of time and effort to modify the machine to handle constant length tubing of a different length.

It is therefore a primary object of the present invention to provide an improved tubing processing machine, relatively compact in size, which is extremely flexible in application in that it can very easily and quickly (less than one minute), and without requiring special operator ability, be converted from being set for performing a sequence of operations on tubing of one constant length to being set for performing the same sequence of operations on tubing of a different constant length. Tubing fabricated on the machine of the present invention may be delivered for bending to the bending section of the aforesaid patented machine.

Other objects, features and advantages of the present invention will become apparent from the subsequent description and the appended claims, taken in conjunction with the accompanying drawings.

BRIEF DESCRIPTION OF THE DRAWINGS

FIG. 2 is a top plan view of the apparatus of FIG. 1 with parts broken away;

FIG. 3 is a fragmentary end view of the right hand end of the apparatus illustrated in FIG. 1;

FIG. 5 is an elevational view, partly in section, of a portion of the left hand end of the apparatus illustrated in FIG. 4;

FIG. 7 is a vertical fragmentary sectional view taken generally along line 7—7 in FIG. 2 with portions thereof broken away;

FIG. 8 is a vertical fragmentary sectional view taken generally along line 8—8 in FIG. 2 with portions thereof broken away;

DETAILED DESCRIPTION OF THE PREFERRED EMBODIMENT

Figures 1, 12, 13, 14:
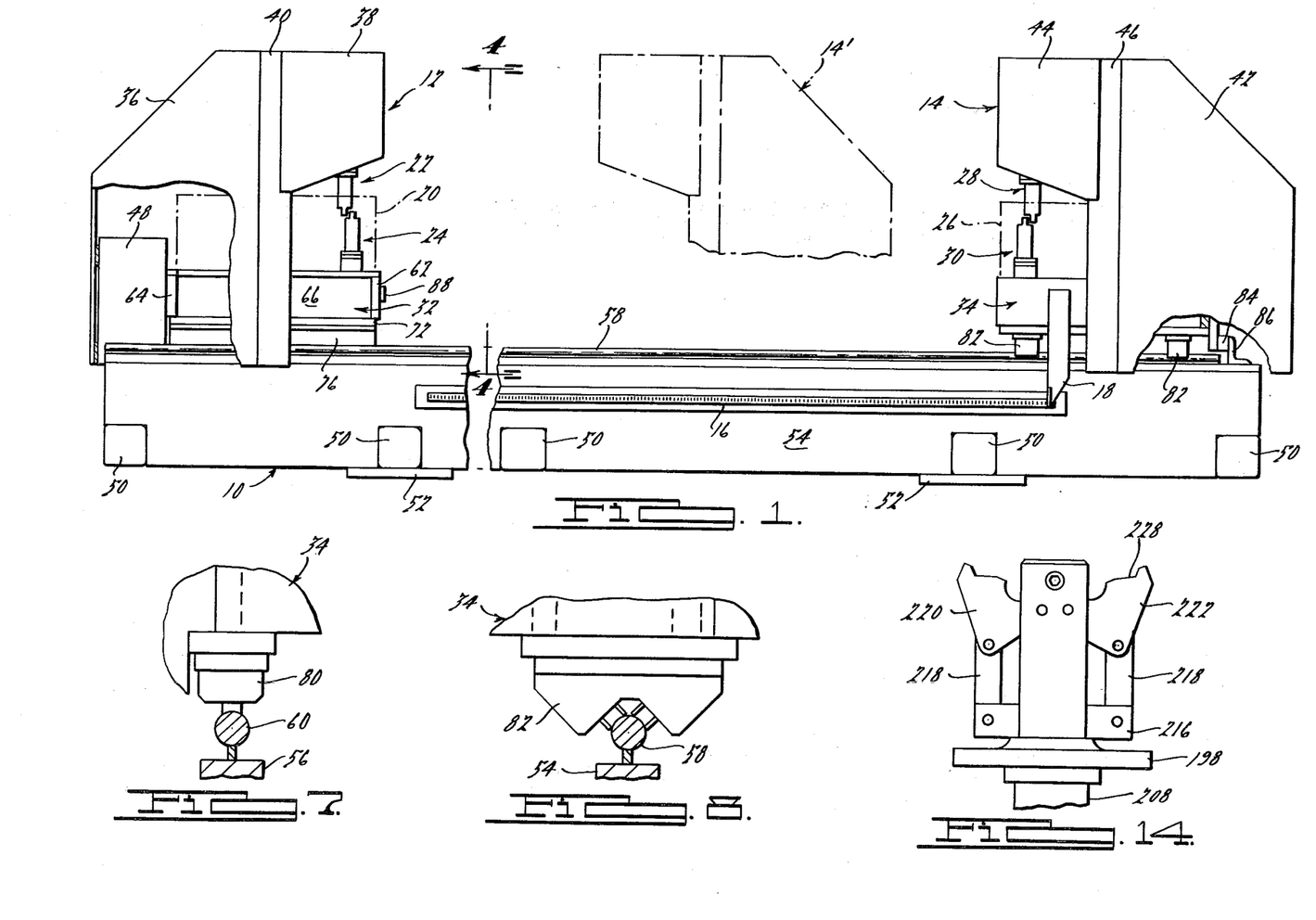
FIG. 1 is a side elevational view of an apparatus embodying the principles of the present invention, with portions thereof broken away.
FIG. 12 is an elevational view partly in section of one of the clamping devices of the present invention illustrated in a closed gripping position.
FIG. 13 is a side elevational view of the clamping device shown in FIG. 12.
FIG. 14 is a fragmentary view similar to FIG. 12 but showing the clamping device in an open position.

The apparatus of the present invention, best shown in overall in FIGS. 1, 2 and 3, generally comprises a base structure 10, a fixed fabricating module 12 rigidly secured to base structure 10, a movable fabricating module 14 which may be adjusted to any desired position on base structure 10 to accommodate tubes of different lengths, and means for indicating the spacing of the movable module with respect to the fixed module, including indicia 16 affixed to base structure 10 and an indicator device 18 affixed to module 14. Movable module 14 is illustrated in phantom in an intermediate position at 14'.

Module 12 is provided with a plurality of work stations 20 which may be of any desired number and which may incorporate fabricating, forming or processing devices of any type which are desired to be used to process tubing. Because the type of fabricating or processing operation used is not a part of this invention, work stations 20 are merely indicated as available space for such operations defined by phantom lines. Fixed module 12 is provided with transporting means for moving individual lengths of tubing from the entrance end thereof (i.e., at the top of FIG. 2) to the exit end thereof (at the bottom of FIG. 2). This transporting means comprises movable device 22 and stationary devices 24. Movable module 14 is provided with a plurality of similar work stations 26, also of any desired nature, as well as its own transporting means comprising movable devices 28 and stationary devices 30. The basic structural framework of fixed module 12 is a frame structure 32 which support the work stations and stationary devices, as well as most of the other elements of the apparatus to be described. Movable module 14 is provided with a similar frame structure 34.

The internal mechanisms of fixed module 12 are covered for protection and safety purposes by means of sheet metal covers 36 and 38 supported by a suitable cover support structure, a portion of which is shown at 40. Similarly, movable module 14 is provided with covers 42 and 44 supported by suitable framework, a portion of which is shown at 46. The modules may be provided with suitable compartments, such as shown at 48, for the purpose of housing the controls and like devices utilized in the apparatus, which controls and devices as such form no part of the present invention.

Base structure 10 generally comprises a plurality of transverse structural members 50, several of which rest on pads 52, to which are rigidly connected a pair of longitudinally extending generally parallel structural members 54 and 56 having affixed along the upper edge surfaces thereof rails 58 and 60, respectively, formed of hardened steel and being of circular cross-section. Indicia 16 may be in the form of a scale or the like affixed to the outside side of structural member 54. A deck 61 may be provided between members 54 and 56. Base structure 10 may be of any desired length, depending on the range of tubing lengths to be processed.

Figure 4:
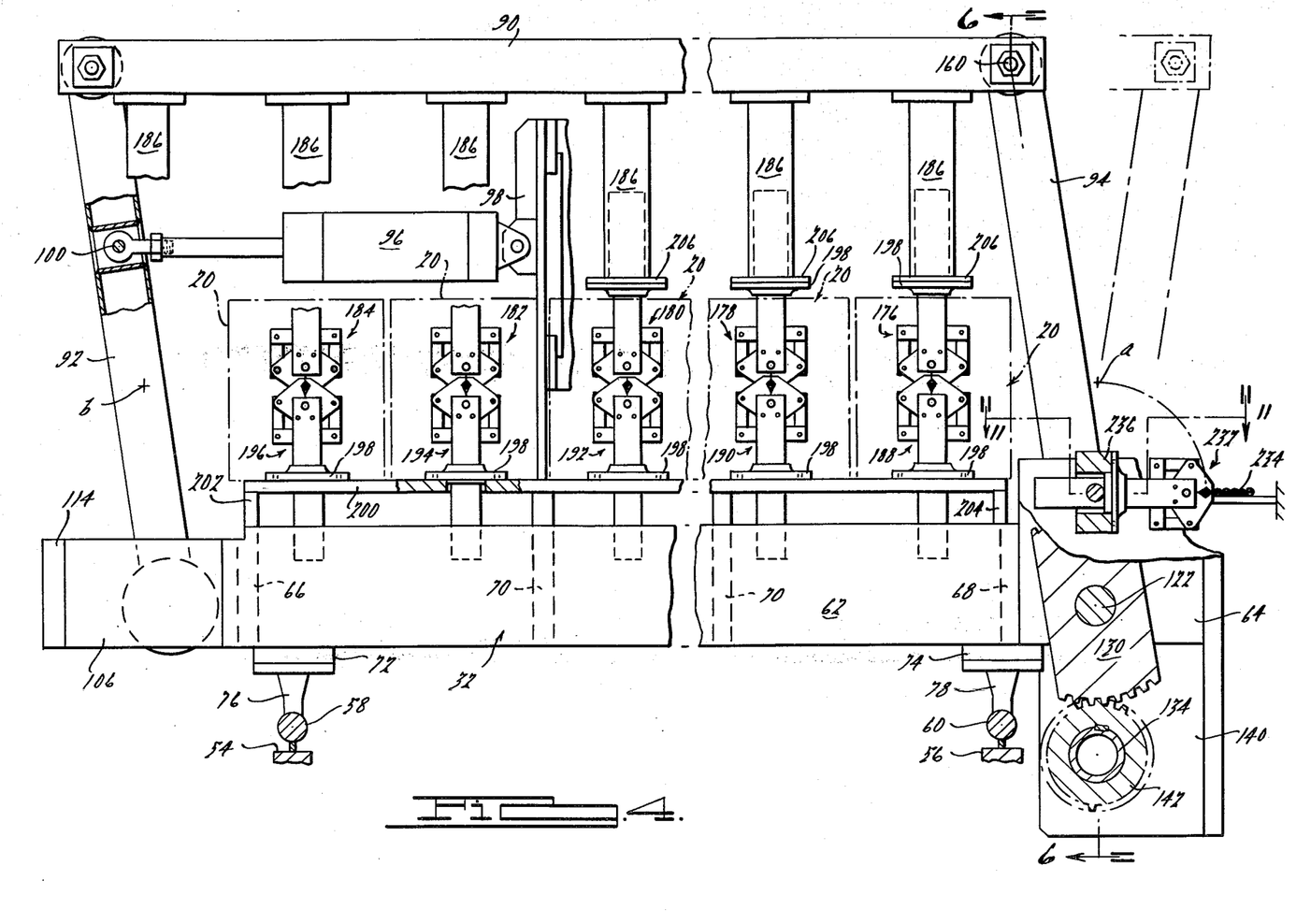
FIG. 4 is an elevational view looking generally along line 4—4 in FIG. 1 with portions thereof broken away, the right-hand portion of the view being a section taken generally along line x—x in FIG. 6.

Because the frame structures and associated mechanisms of both modules are substantially the same, except for the adjustable nature of module 14, only the construction of module 12 will be described in detail. As best illustrated in FIGS. 4 and 5, frame 32 comprises structural side elements 62 and 64 and end elements 66 and 68 welded thereto. A plurality of internal structural elements 70 may also be provided for reinforcing the structure and providing means for mounting components of the apparatus. A pair of longitudinally extending members 72 and 74 are affixed to the bottom surface of frame structure 32 along the ends thereof and affixed thereto are connecting members 76 and 78 which are rigidly secured to rails 58 and 60, respectively, in any desired manner.

As best seen in FIGS. 7 and 8, movable module 14 is not rigidly affixed to the rails but is mounted thereon by means of anti-friction recirculating linear motion roller bearing devices 80 and 82. These devices, called "Roundway" bearings, supplied by Thomson Industries, Inc., Manhasset, New York, permit very low friction linear movement between the moving module and the rails. At least one of the devices, in this case device 82, is designed so as to resist side loads so that movement of module 14 is restricted to the path defined by rails 58 and 60. As can be seen in FIG. 1, two longitudinally spaced bearing devices are used at each end of frame structure 34. To limit the maximum movement of module 14 to the right as shown in FIG. 1, a suitable stop 84 is affixed to frame structure 34 which is adapted to engage an upstanding projection 86 affixed to base structure 10. Movement of module 14 towards module 12 is limited by engagement of frame structure 34 upon a cushioning stop element 88 affixed to frame structure 32.

Figure 6:
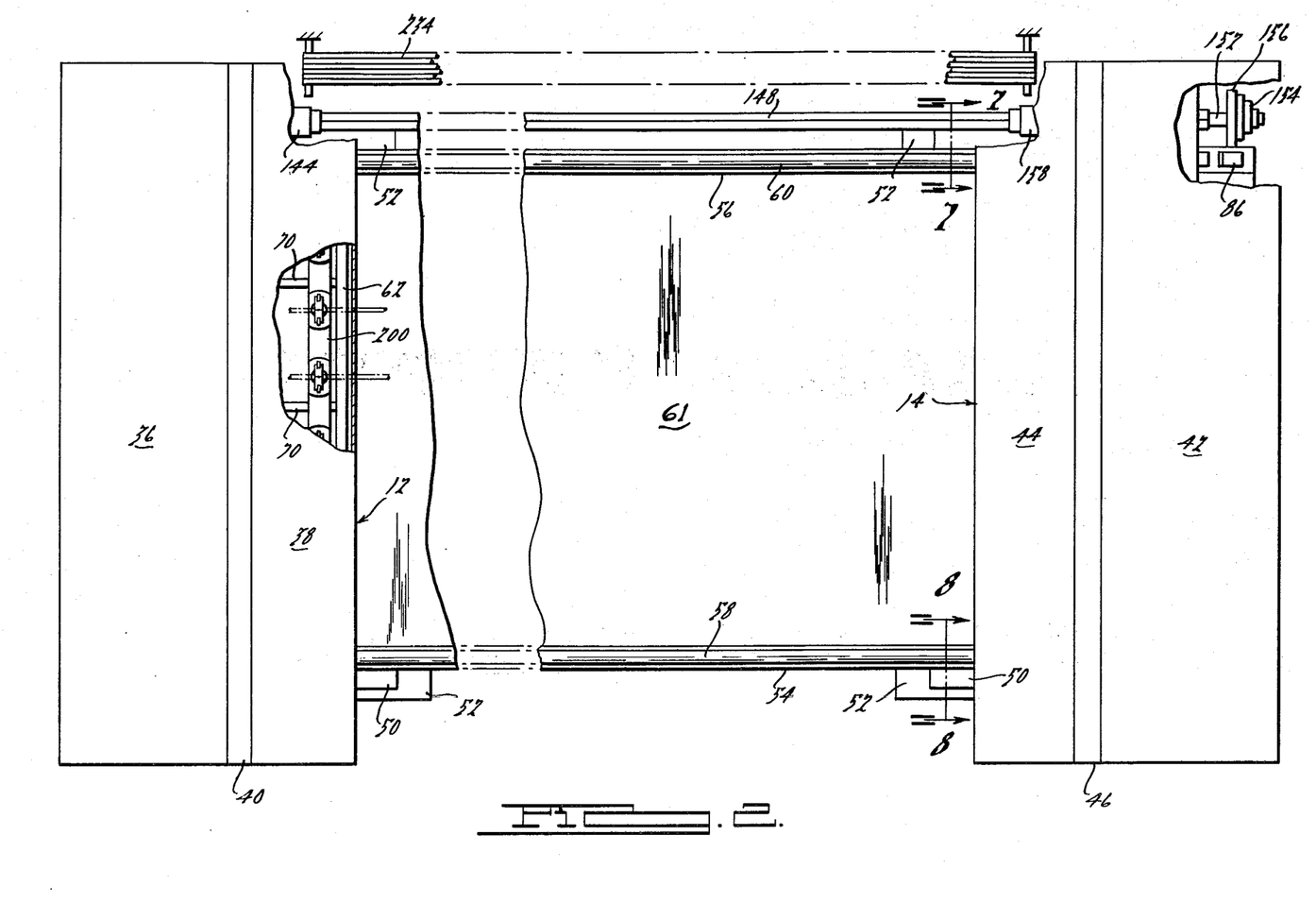
FIG. 6 is a vertical fragmentary sectional view taken generally along line 6—6 in FIG. 4.

The transporting means of the present invention is best illustrated in FIGS. 4, 5 and 6 and generally comprises an oscillating bridge 90 pivotally supported at each end by means of a pair of generally parallel oscillating arms 92 and 94, the pivotal axes of which are located in a plane parallel to the upper surface of frame structure 32 so that bridge 90 is maintained in parallel alignment with frame structure 32 as it oscillates back and forth between the full line and phantom line positions illustrated in FIG. 4. Actuation of the bridge may be achieved by means of a pneumatic cylinder 96 pivotally affixed in the usual manner at one end of a suitable support structure 98, and having it piston rod pivotally connected in the usual manner to a transversely extending pin 100 affixed to arm 92 and retained by set screws 101. The internal cushion stops in pneumatic cylinder 96 may be used to limit the stroke thereof and thereby define the limits of travel of bridge 90 or separate stroke control devices may be used. The length of arms 92 and 94 and the location and stroke of pneumatic cylinder 96 may be chosen to give the desired length and path of travel of bridge 90.

As best shown in FIGS. 4 and 5, arm 92 is formed as a box section and is pivotally supported on frame structure 32 by means of a journal assembly 102 which is rotatably supported upon a fixed shaft 104 supported at one end by side element 64 and at the opposite end by a projecting structural element 106 affixed to end element 66. Shaft 104 is retained in place by means of a threaded fastener and washer, as indicated at 108, and journal 102 is maintained in position on shaft 104 by means of a threaded fastener 110 affixed to the shaft which restrains the journal via a spacer 112. Elements 106 and 64 may be interconnected at their outer ends by means of a reinforcing element 114 welded thereto.

Referring to FIGS. 4 and 6, arm 94 is pivotally mounted to frame structure 32 by means of a journal 116 rotatably supported by bearings 118 and 120 upon a stationary shaft 122 affixed at one end to a structural element 124 affixed to element 68 and at its other end to element 64. Shaft 122 is retained by means of a threaded fastener and washer as indicated at 124 and journal 116 is maintained in position by means of a threaded fastener 126 and spacer 128. Arms 94 and 92 are thus pivotally supported upon the frame structure in substantially the same manner and in the same plane, the primary difference being that the support for arm 94 further includes a synchronizing gear 130 rigidly affixed, by means of a flange 132, to journal 116. Gear 130, which may be cut off on the two edges for clearance (FIG. 4), thus oscillates with arm 94.

The transport means for movable module 14 contains a pair of arms and bridge identical to those just described, which are actuated by their own independently powered pneumatic cylinder, which can be connected to either arm. However, to facilitate synchronization of the movement of each of the bridges in the respective modules, synchronizing means may be provided, such being more essential the shorter the length of tubing being processed. This synchronizing means comprises a hollow shaft 134, journalled by means of bearings 136 and 138 affixed to an extension 140 from element 64 and to element 124, respectively, having keyed thereto a gear 142 which is disposed in meshing engagement with gear 130. The rotational axis of shaft 134 extends in a longitudinal direction and the free end thereof has affixed thereto, by means of a fitting 144 held in place by a tapered pin 146, a longitudinally extending shaft 148 of square cross-section. Shaft 148 is maintained in nonrotating engagement with fitting 144 by means of a tapered pin 150. As can thus be visualized, oscillation of arm 94 will result in the oscillation of square shaft 148. As best illustrated in FIG. 2, square shaft 148 extends from fixed module 12 (to which it is affixed in the manner just described) for the entire length of the machine and at the opposite end thereof is provided with a cylindrical portion 152 journalled within a suitable bearing assembly 154 affixed to an appropriately mounted bracket 156 anchored to the base structure of the apparatus.

Synchronization between the modules is created by square shaft 148 which slidingly passes through a fitting 158 which engages a gear (not shown) on the movable module corresponding to gear 142 on the fixed module, and which is connected via a second gear to the oscillating arm on the movable module corresponding to arm 94. As the movable module is moved to different positions on rails 58 and 60 to accommodate different lengths of tubing, fitting 158 slides over square shaft 148, but because of the non-circular cross-section thereof the rotational angular positions thereof are always maintained. The ratio of gears 142 and 130, and the corresponding gears in the movable module, is not important so long as they are the same in both modules. By virtue of this synchronizing arrangement bridge 90 in the fixed module will always be synchronized with the movement of the corresponding bridge in the movable module. It is not intended that any operating force be transmitted via square shaft 148, but that independent power cylinders in each of the modules provide the basic power required. When the machine is utilized to process tubing which is very long, e.g., greater than 8 feet for $\frac{3}{8}$ inch or less diameter tubing, synchronization may not even be required because of the inherent flexibility of the tubing, although it may be necessary to provide some type of elementary transverse tubing support between the modules to prevent excessive sag.

Bridge 90, which is channel-shaped in cross-section, may be hinged to the oscillating arms in the manner best illustrated in FIG. 6, wherein bridge 90 is provided with a fixed quill shaft 160 retained in place at one end by a suitable threaded fastener 162 and having the opposite end thereof provided with an extension 164 rotatively supported within a journal structure 166 affixed to the arm by means of bearings 168 and 170. A suitable threaded fastener 172 may be provided at the free end of the extension to maintain the parts in assembled relationship. Spacing between bridge and arm may be provided by a shouldered portion 174 provided on shaft 160. As can be visualized, the assembly is so arranged that the bridge may be easily removed from the oscillating arms by merely removing the fasteners 172 and withdrawing the quill extensions from the journals on the arms. Both ends of the bridge are mouned in the same way.

Again referring to the fixed module, movable devices 22 of the transporting means comprise a plurality of pneumatically actuable clamps 176, 178, 180, 182 and 184 in the embodiment shown. Each of the clamps is supported by bridge 90 by means of an extension 186. In the embodiment shown there are provided five work stations, which in accordance with the principles of this invention requires the use of six movable clamps, i.e., one more than the number of work stations. In FIG. 4 the sixth clamp would be located to the left of clamp 184, at point b, but is not illustrated in order to permit disclosure of other features of the apparatus. Movable devices 28 on module 14 are the same as devices 22.

The stationary devices 24 of the transporting means on the fixed module comprise pneumatically actuable fixed clamps 188, 190, 192, 194 and 196, one located at each work station 20. Each of the clamps 188–196 is provided with a mounting flange 198 which is bolted to a support element 200 slightly spaced above and affixed to frame structure 32 by means of support elements 202 and 204. Fixed devices 30 on module 14 are the same as devices 24. Clamps 176–184 are also provided with mounting flanges 198 which are mounted to suitable flanges 206 provided at the lower ends of extensions 186. Clamps 176–184 should be as close as possible to clamps 188–196 in the longitudinal direction to facilitate the clamping of tubing which may not be perfectly straight.

The details of each of the pneumatically actuated clamps is best illustrated in FIGS. 12–14. Each clamp comprises a single-acting pneumatic cylinder 208 having a reciprocal piston rod 210 and a mounting flange 198. Each mounting flange 198 has projecting therefrom a bifurcated support element providing spaced supports 212 and 214. Piston rod 210 is disposed between supports 212 and 214 and has rigidly secured to the free end thereof a cross-slide 216 each end of which is of greater width than the center portion disposed between supports 212 and 214, and is provided with a vertical slot in which is pivotally mounted a link 218. The adjacent edges of supports 212 and 214 may be ground flat, as at 219, to help guide cross-slide 216. Adjacent the upper end of supports 212 and 214 are pivotally mounted a pair of identically configured jaws 220 and 222 by means of pins 224 and 226, respectively, extending between the two supports. The outer edges of each of the jaws 220 and 222 is provided with a vertical slot on which is pivotally disposed an upper end of one of the links 218. Each of the jaws is also provided with a tube gripping surface 228 of the shape best illustrated in FIG. 12, which is adapted to be of universal applicability in grabbing and clamping tubing having a wide range of outside diameters. The outer ends of supports 212 and 214 may be reinforced by means of a spacer and fastener assembly 230 extending therebetween. Each of the jaws may be provided with a clearance recess to avoid contact with spacer assembly 230.

The clamp is illustrated in FIGS. 12 and 13 in its closed clamping position wherein the piston is fully extended under the influence of air pressure supplied in the normal manner. Venting of the air supply line of the cylinder causes the usual internal return spring in the cylinder to move the piston downwardly to thereby cause the jaws to pivot to their open position, as illustrated in FIG. 14. Compressed air thereafter supplied to the cylinder will actuate the jaws to their closed positions. The clamp construction disclosed is merely representative of the numerous types of clamps and jaw cofigurations which may be used. Furthermore, different types of clamps may be used together in the same machine.

Figure 11:
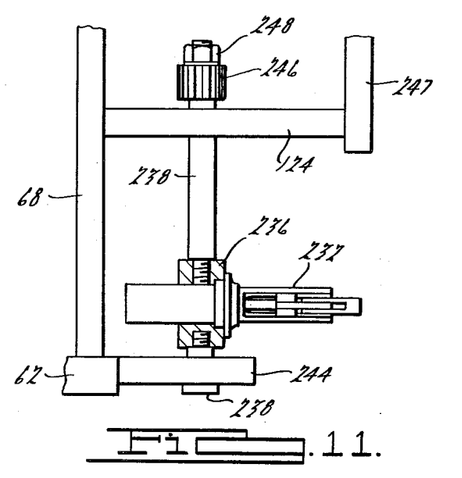
FIG. 11 is a fragmentary sectional view taken generally along line 11—11 in FIG. 4.
Figure 12:
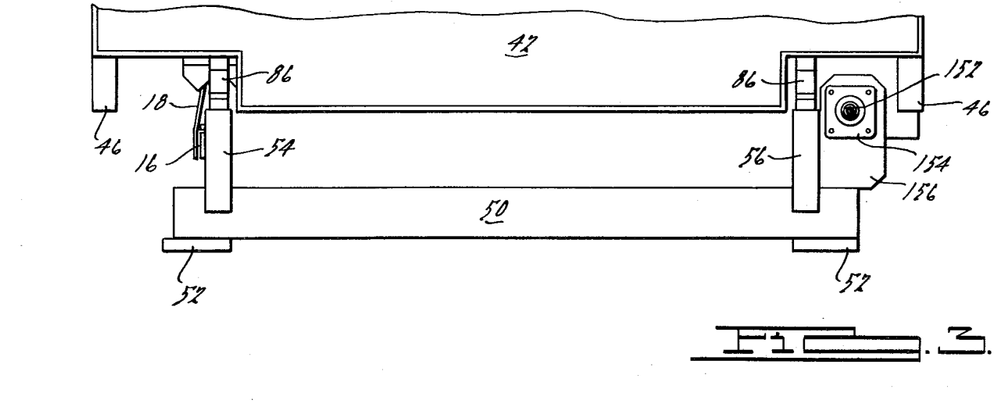
Figure 13:
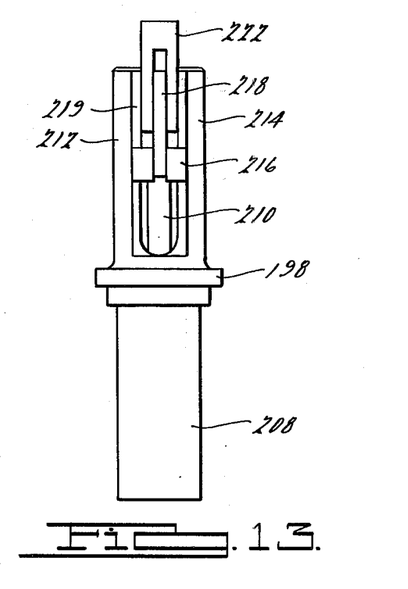

In addition to the movable clamps previously described (one greater in number than the number of work stations) and the stationary clamps described (one at each work station) there is also provided a swinging clamp 232 for introducing lengths of tubing from a tubing supply, such as indicated at 234 in FIG. 4, into the module for processing. As best illustrated in FIGS. 4, 6 and 11, clamp 232 is rigidly secured to a mounting block 236 which is affixed to a shaft 238 journalled by means of bearings 240 and 242 to an extension 244 of element 62 and to element 124, respectively. Because the clamp passes through the center of block 236, shaft 238 is effectively split into two portions the adjacent ends of which are threadably secured to block 236 in the manner shown. A reinforcing member 247 may be provided between extension 244 and element 64. The right-hand free end of shaft 238, as viewed in FIG. 6, is provided with a gear 246 keyed thereto and retained in place by a suitable threaded fastener 248. The pitch of gear 246 with respect to that of gear 130 is chosen so that clamp 232 will move a piece of tubing from the tubing supply point to a point in the module, indicated at a in FIG. 4, where it can be subsequently grabbed and transported in the manner to be described. If necessary the jaws of clamp 232 may be slightly relieved at the outer end to facilitate the grabbing of a single piece of tubing out of the supply. Also, tubing may be supplied to the present apparatus utilizing the equipment disclosed in Applicants' copending application filed of even date, Ser. No. 816,074 entitled "Cylindrical Member Processing Apparatus".

The principle of operation of the transporting means of the apparatus disclosed is similar to that illustrated in Applicants' aforesaid U.S. Pat. No. 3,874,048 in that each length of tubing is transported in a direction transverse to its longitudinal axis by a "hand-to-hand" movement sequentially to each work station. This can be visualized with reference to FIG. 4, wherein the apparatus is disclosed in a condition just prior to introducing a new length of tubing into the apparatus for processing. As can be seen, all of the movable and stationary clamps have been actuated and are engaging a length of tubing adjacent the end thereof disposed within the module, and clamp 232 has engaged the next length of tubing to be introduced into the apparatus. The apparatus is cycled by deenergizing the movable clamps so they wil open and then energizing pneumatic cylinder 96 to cause bridge 90 to oscillate to the right. This will cause clamp 232 to rotate counter-clockwise approximately 90° to lift the tubing clamped thereby to position a at the same time that clamp 176 is moved generally horizontally to the same point, and the length of tubing retained by the leftmost movable clamp (not shown) located at point b is dropped into whatever collection device is utilized to collect processed tubing. Each of the other clamps 178–184, as well as the left-most movable clamp not shown, move one work station to the right as shown in FIG. 4 into alignment with each length of tubing disposed thereat. All of the movable clamps are thereafter energized to clamp the length of tubing at their respective locations. Thereafter all of the stationary clamps and clamp 232 are deenergized to open and bridge 90 is oscillated back to the solid line position shown to carry each of the respective tube lengths to the next leftmost position, whereupon the stationary clamps are energized to grab the new length of tubing brought to their respective locations. At the same time, clamp 232 swings clockwise to grab a new length of tubing from the supply.

During the period each length of tubing is disposed at a work station having processing means thereat, the latter may be actuated to perform the intended processing operation. Typical operations to be performed in an apparatus of the type disclosed include deburring, assembling fittings, flaring, tube cleanout, etc. These operations are similar to those performed in assembling station 32 of the apparatus disclosed in the aforesaid U.S. Pat. No. 3,874,048 and may be accomplished in substantially the same manner. Other operations are of course possible, depending upon the desired result. Any number may be provided on each module, and each module may be of any desired transverse dimension, so long as both modules are the same. Another advantage the present invention offers over the aforesaid patented machine is that the tubing is not inverted at each successive work station. The apparatus illustrated is adapted to be operated entirely by pneumatic controls and actuated using pneumatic cylinders. All of the controls, sensors, interlocks, sequencing devices, etc. are provided in accordance with conventional practices using standard parameters and do not per se constitute part of the present invention. If desired, electrical or hydraulic systems can be used with equal success in accordance with state-of-the-art principles.

Other possible modifications include using a different type of loading arrangement. For example, a swinging clamp having a 180° arc may be used, or instead of a swinging clamp, the rightmost movable clamp (FIG. 4) could be used for loading purposes. Furthermore, rather than having a slightly arcuate path of movement of the movable clamps, a linear path for tubing transport may be provided by merely reciprocating the bridge on a way instead of pivoting it at the end of swinging arms.

Figure 9:
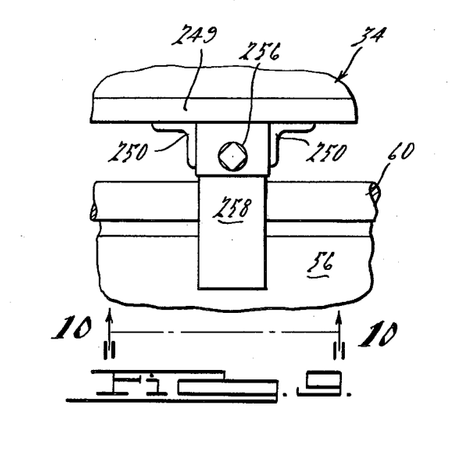
FIG. 9 is a fragmentary elevational view illustrating a clamping device which may be utilized in the apparatus of FIG. 1.
Figure 10:
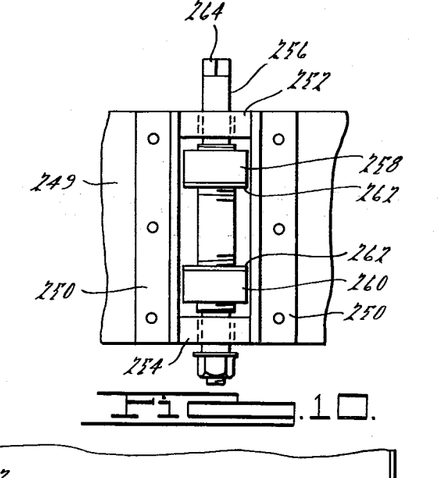
FIG. 10 is a fragmentary view looking generally along line 10—10 in FIG. 9.

Although there are a number of ways in which movable module 14 may be locked at the desired location on rails 58 and 60 for a given length of tubing there is disclosed in FIGS. 9 and 10 a suitable device for accomplishing this function. FIG. 9 illustrates a longitudinally extending brace 249 affixed to the lower surface of frame structure 34 and having secured thereto a pair of transversely extending angle members 250 which overlie rail 60 and member 56. Disposed between members 250 at each end thereof and affixed thereto are a pair of apertured supports 252 and 254 which rotationally support an adjusting screw 256. Threadably supported by screw 256 by threads of opposite hand are downwardly depending gripping elements 258 and 260 having on the opposed faces thereof a resilient pad 262. Rotation of elements 258 and 260 with respect to the module is prevented by their engagement with members 250 between which they loosely slide, so that rotation of screw 256 will cause elememts 258 and 260 to either move towards or away from one another depending upon the rotation of the screw, actuation of which may be accomplished by applying a suitable wrench to squared end 264. The parts are so arranged that depending gripping elements 258 and 260 overlie the sides of member 56 so that when the movable module has been positioned at the proper location, which may be readily determined from the indicating means for the length of tubing to be processed, adjusting screw 256 may be rotated to cause elements 258 and 260 to clampingly grip member 56 and retain the module in place. The arrangement thus facilitates very quickly changing the dimensions of the machine for a different length tubing.

Thus, there is disclosed in the above description and in the drawings an improved apparatus for fabricating tubing which fully and effectively accompishes the objectives thereof. However, it will be apparent that variations and modifications of the disclosed embodiment may be made without departing from the principles of the invention or the scope of the appended claims.

We claim:

1. An apparatus for processing a plurality of pieces of tubing of a first predetermined length comprising:
    a fixed machine module having an entrance end and an exit end and a plurality of work stations disposed thereon between said entrance and exit ends for performing work on said pieces of tubing in the vicinity of one end thereof;
    a movable machine module which is spaced from said fixed module a sufficient distance to permit one end of a piece of tubing of said first predetermined length to be disposed at said movable module while the opposite end thereof is disposed at said fixed module, said movable module being movable with respect to said fixed module to accommodate pieces of tubing of a second predetermined length and having an entrance end and an exit end and a plurality of work stations disposed thereon between said entrance and exit ends for performing work on said pieces of tubing in the vicinity of one end thereof;

a first transport apparatus on said fixed module and having a first power source, a second transport apparatus on said movable module and having a second power source which is separate and independent of said first power source and which cooperates with said first transport apparatus for moving said pieces of tubing in a hand-to-hand fashion in a direction transverse to the longitudinal axis of said pieces of tubing, each said transport apparatus comprising means for engaging a single piece of tubing adjacent an end thereof while it is disposed in a supply of tubing in the vicinity of said entrance end and transporting said single piece of tubing to said entrance end, and transporting means which engages said single piece of tubing adjacent an end thereof at said entrance end and which oscillates between said entrance end and a work station and between each said work station for transporting said single piece of tubing across the module on which it is disposed into alignment with each said work station, and which oscillates between a work station and said exit end for thereafter transporting said single piece of tubing to said exit end of the module.

2. An apparatus as claimed in claim 1, wherein said transporting means transport said single piece of tubing sequentially into alignment with each of said work stations.

3. An apparatus as claimed in claim 1, further comprising means operatively interconnecting said modules for synchronizing said first transport apparatus with said second transport apparatus.

4. An apparatus as claimed in claim 1, wherein each said transporting means comprises a plurality of stationary actuatable clamps and a plurality of movable actuatable clamps which oscillate between said stationary clamps for moving said pieces of tubing from one stationary clamp to the next in sequence.

5. An apparatus as claimed in claim 1, wherein each said engaging means comprises an oscillating clamp which oscillates between said entrance end and said supply of tubing.

6. An apparatus as claimed in claim 1, wherein each said transporting means comprises a plurality of stationary actuatable clamps, each of which is aligned with one of said work stations, and a plurality of movable actuatable clamps which oscillates between said stationary clamps for moving said pieces of tubing from one stationary clamp to the next in sequence.

7. An apparatus for processing a plurality of pieces of tubing of a first predetermined length comprising:
a first machine module having an entrance end and an exit end;
a second machine module having an entrance end and an exit end, said second module being spaced from said first module a sufficient distance to permit one end of a piece of tubing of said first predetermined length to be disposed at said second module while the opposite end thereof is disposed at said first module, and movable with respect to said first module to accommodate tubing of a second predetermined length;

a plurality of work stations disposed on one of said modules between said entrance and exit ends for performing work on said tubing in the vicinity of one end of said tubing; and a transport apparatus on each of said modules for moving tubing in a direction transverse to the longitudinal axis of said tubing, each said transport apparatus comprising means for engaging a single piece of tubing adjacent an end thereof while it is disposed in a supply of tubing in the vicinity of said entrance end and transporting said single piece of tubing to the module, and means for transporting said single piece of tubing across the module on which it is disposed sequentially into alignment with each of said work stations, and thereafter transporting said single piece of tubing to said exit end of the module, said transporting means comprising a pair of generally oscillating arms, an oscillating bridge member pivotably supported by said arms, and means carried on said bridge member for gripping said single piece of tubing adjacent an end thereof while it is being transported.

8. An apparatus as claimed in claim 7, further comprising means operatively interconnecting said modules for synchronizing said transport apparatus on said first module with said transport apparatus on said second module.

9. An apparatus as claimed in claim 8, wherein said synchronizing means includes means for maintaining the rotational angular positions of said arms and said bridge member of said first module relative to the rotational angular positions of said arms and said bridge member of said second module when said second module is moved relative to said first module.

10. An apparatus for processing a plurality of pieces of tubing of a predetermined length comprising:
a first machine module having an entrance end and an exit end;
a second machine module having an entrance end and an exit end and being spaced from said first module a sufficient distance to permit one end of a given piece of tubing to be disposed at said second module while the opposite end thereof is disposed at said first module;
at least one work station disposed on each of said modules between said entrance and exit ends for performing work on said tubing in the vicinity of one end of said tubing;
a transport apparatus on each of said modules having a separate and independent power source for moving tubing in a hand-to-hand fashion in a direction transverse to the longitudinal axis of said tubing, each said transport apparatus comprising means for engaging a single piece of tubing adjacent an end thereof disposed in a supply of tubing in the vicinity of said entrance end and transporting same across the module on which it is disposed into alignment with said work station, and thereafter transporting said single piece of tubing to said exit end of the module; and means operatively interconnecting said modules for synchronizing said transport apparatus on said first module with said transport apparatus on said second module, said synchronizing means being operatively independent of said power source on each of said modules and effecting no transmission of driving forces between said modules so that each said power source is in driving relationship with only one of said modules.

11. An apparatus as claimed in claim 10, wherein said second module is movable relative to said first module for accommodating pieces of tubing of a second predetermined length, and said synchronizing means includes means for maintaining said transport apparatus on said second module aligned in said transverse direction relative to said transport apparatus on said first module when said second module is moved relative to said first module.

* * * * *